United States Patent
Mandya Chandranath et al.

(10) Patent No.: US 11,854,046 B2
(45) Date of Patent: Dec. 26, 2023

(54) SYSTEMS AND METHODS FOR PRESENTING AUGMENTED REALITY PROMOTION INDICATORS

(71) Applicant: Walmart Apollo, LLC, Bentonville, AR (US)

(72) Inventors: Deepak Mandya Chandranath, Bangalore (IN); Ramandeep Singh, Bengaluru (IN); Chandresh Bhardwaj, Bengaluru (IN); Venkata Janendra Pachigolla, Bangalore (IN)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 17/176,885

(22) Filed: Feb. 16, 2021

(65) Prior Publication Data

US 2021/0256561 A1 Aug. 19, 2021

Related U.S. Application Data

(60) Provisional application No. 62/976,729, filed on Feb. 14, 2020.

(51) Int. Cl.
*G06Q 30/02* (2023.01)
*G06Q 30/0251* (2023.01)
(Continued)

(52) U.S. Cl.
CPC ..... *G06Q 30/0268* (2013.01); *G06F 3/04842* (2013.01); *G06Q 30/0239* (2013.01);
(Continued)

(58) Field of Classification Search
CPC ............... G06Q 30/02; G06Q 30/0268; G06Q 30/0254; G06Q 10/067; G06Q 30/0246;
(Continued)

(56) References Cited

U.S. PATENT DOCUMENTS 8,606,645 B1 12/2013 Applefeld
9,225,760 B2 * 12/2015 Ralston ................ G11B 27/036
(Continued)

FOREIGN PATENT DOCUMENTS

EP 2704460 A1 * 3/2014 ............. H04W 4/18
WO WO 2008/134227 A1 * 11/2008 ............. G06Q 30/00
(Continued)

OTHER PUBLICATIONS

Lakmal Meegahapola; Indika Perera, Enhanced in-store shopping experience through smart phone based mixed reality application (English), 2017 Seventeeth International Conference on Advances in ICT for Emerging Regions (ICT) )pp. 1-8, Sep. 1, 2017 (Year: 2017).*

(Continued)

*Primary Examiner* — Marilyn G Macasiano
(74) *Attorney, Agent, or Firm* — Barta, Jones & Foley, PLLC

(57) ABSTRACT

In some embodiments, apparatuses and methods are provided herein useful to presenting promotion indicators. In some embodiments, a system for presenting promotion indicators comprises a database configured to store user data, a control circuit configured to receive a user identifier, determine an identity of the user, receive a location indicator, determine a location of the mobile device, select a promotion, transmit a promotion indicator associated with the promotion and an application configured to be executed on the mobile device, wherein the application when executed by the mobile device is configured to receive the promotion indicator, cause presentation of a notification that the promotion indicator is available, determine that the mobile device is oriented toward the location, cause presentation of an augmented reality presentation including the promotion indicator, receive selection of the promotion (Continued)

indicator, and cause transmission, to the database, of the user identifier and an indication of the promotion.

20 Claims, 4 Drawing Sheets

(51) Int. Cl.
  *G06F 3/04842* (2022.01)
  *H04W 4/021* (2018.01)
  *H04W 4/80* (2018.01)
  *G06T 11/00* (2006.01)
  *G06Q 30/0207* (2023.01)

(52) U.S. Cl.
  CPC ............. *G06T 11/00* (2013.01); *H04W 4/021* (2013.01); *H04W 4/80* (2018.02); *G06T 2200/24* (2013.01)

(58) Field of Classification Search
  CPC . G06Q 30/0207; G06F 3/04842; G06T 11/00; G06T 2200/24; H04W 4/021; H04W 4/80; H04W 4/02
  See application file for complete search history.

(56) References Cited

U.S. PATENT DOCUMENTS

| | | | |
|---|---|---|---|
| 10,095,929 | B1 | 10/2018 | Hoover |
| 10,108,986 | B2 * | 10/2018 | Jacobs ............... G06Q 30/0643 |
| 11,049,074 | B1 * | 6/2021 | Eby .......................... G06F 16/29 |
| 11,200,611 | B2 * | 12/2021 | Piramuthu ............ G06F 16/583 |
| 2015/0170256 | A1 | 6/2015 | Pettyjohn |
| 2015/0242902 | A1 * | 8/2015 | Viswanath ............ G06F 3/0482 705/14.64 |
| 2018/0018708 | A1 | 1/2018 | Locke |
| 2019/0108558 | A1 | 4/2019 | Spivack |
| 2020/0186966 | A1 * | 6/2020 | Mycek ............... G06Q 30/0267 |
| 2021/0201030 | A1 * | 7/2021 | Ju .......................... G06V 20/20 |

FOREIGN PATENT DOCUMENTS

| | | | | |
|---|---|---|---|---|
| WO | WO 2009/073433 A1 * | 6/2009 | ............. | G06Q 30/00 |
| WO | WO 2013/184131 A1 * | 12/2013 | ............. | G01S 19/03 |
| WO | 2015195413 | 12/2015 | | |
| WO | WO 2019/168780 A1 * | 9/2019 | ............. | G06Q 30/02 |

OTHER PUBLICATIONS

Barthold, C.; Pathapati Subbu, K.; Dantu, R., Evaluation of gyroscop-embedded mobile phones (Englih), 2011 IEEE International Coference on Systems, Man, and cybernetics (pp. 1632-1638, Oct. 1, 2011 (Year: 2011).*

System, method and computer program product for presenting an option to receive advertisement content (English) (Unites States)) The IP.com Prior Art Database, Nov. 29, 2006 (Year: 2006).*

Kam-Yiu Lam; J.K. Ng; Jian-Tao Wang, A Business Model for Personalized Promotion Systems on Using WLAN Localization and NFC Techniques (English), 2013 27th International Conference on Advanced Information Networking and Applications Workshops (pp. 1129-1134), Jul. 19, 2013 (Year: 2013).*

Bruno Lopes; Ricardo Lopes Pereira, ShopAssist—A unified location-aware system for shopping(English), 2016 Global Information Infrustructure and Networking Symposium (GIIS) (pp. 1-6), Oct. 1, 2016 (Year: 2016).*

Goldstein, Phil; "What Is Augmented Reality's True Potential in Retail?"; https://biztechmagazine.com/article/2017/08/what-augmented-realitys-true-potential-retail; Published Aug. 10, 2017; 5 pages.

Cloutier, John; "NliteN for Retail"; http://bellintegrator.com/AugmentedReality/NliteN-Retail; Available as early as Jul. 23, 2019; 5 pages.

Levski, Yariv; "How Augmented Reality Benefits Retail and Shopping"; http://appreal-vr.com/blog/ar-in-retail-shopping/; Sep. 22, 2020; 9 pages; retrieved from Internet Archive Wayback Machine https://web.archive.org/web/20200922172311/https://appreal-vr.com/blog/ar-in-retail-shopping/ on May 13, 2021.

* cited by examiner

SYSTEMS AND METHODS FOR PRESENTING AUGMENTED REALITY PROMOTION INDICATORS

CROSS-REFERENCE TO RELATED APPLICATION

This application claims the benefit of U.S. Provisional Application No. 62/976,729, filed Feb. 14, 2020, which is incorporated by reference in its entirety herein.

TECHNICAL FIELD

This invention relates generally to retail and, more particularly, providing promotions in a retail environment.

BACKGROUND

Retailers strive to accommodate customers and encourage sales. One such method of encouraging sales is by offering customers discounts, special pricing, special offers, etc. Not only do such offers increase sales for the retailer, they also promote customer satisfaction. With the ever increasing ability to capture, store, and process data, providing customers with targeted promotions is becoming more common. One such method of providing targeted promotions is via email. For example, a customer's online account is typically linked to an email account and the customer's shopping trends are tracked. The customer's shopping trends are then used to select a promotion for the customer and the promotion is delivered to the customer via email. Unfortunately, delivering promotions via email has become so ubiquitous that many customers overlook these emailed promotions.

BRIEF DESCRIPTION OF THE DRAWINGS

Disclosed herein are embodiments of systems, apparatuses, and methods pertaining to presenting promotion indicators to users. This description includes drawings, wherein.

Figure 1:
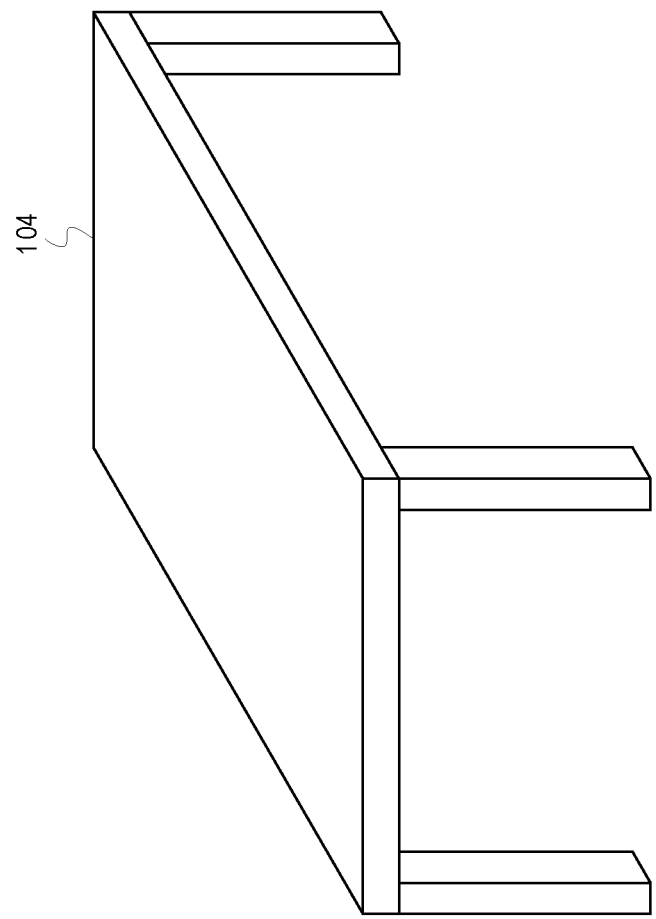
FIG. 1 depicts an augmented reality presentation including a promotion indicator 108 presented via a mobile device 102, according to some embodiments.
Figure 1:
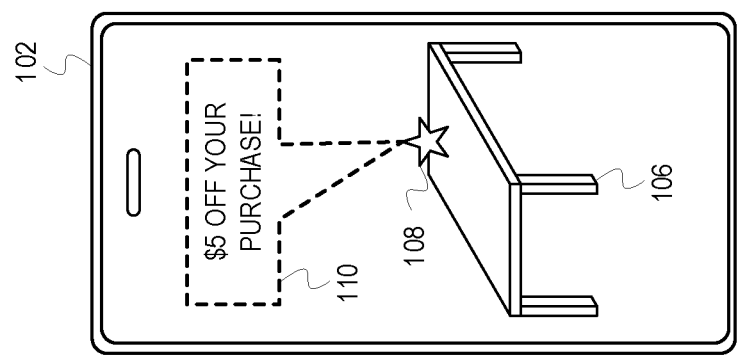

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various embodiments, systems, apparatuses and methods are provided herein useful to presenting promotion indicators to users. In some embodiments, a system for presenting promotion indicators to users comprises a database, wherein the database is configured to store user data, a control circuit, wherein the control circuit is configured to receive, from a mobile device, a user identifier associated with a user, determine, based on the user identifier, an identity of the user, receive, from the mobile device, a location indicator, determine, based on the location indicator, a location of the mobile device, select, based on the identity of the user and the location of the mobile device, a promotion, transmit, for presentation via the mobile device, a promotion indicator associated with the promotion, wherein the promotion indicator is associated with a location near the location of the mobile device, and an application configured to be executed on the mobile device, wherein the application when executed by the mobile device is configured to receive, from the control circuit, the promotion indicator associated with the promotion, cause presentation, to the user, of a notification that the promotion indicator is available, determine that the mobile device is oriented toward the location, cause presentation, in response to determining that the mobile device is oriented toward the location via a display device, of an augmented reality presentation including the promotion indicator associated with the promotion, receive, via a user input device from the user, selection of the promotion indicator, and cause transmission, to the database for storage, of the user identifier and an indication of the promotion.

As previously discussed, providing promotions (e.g., sales, discounted prices, special offers, etc.) can not only increase sales, but can also increase customer satisfaction. For example, customers are typically happy when they save money while purchasing a product. Further, if the promotion is specific to the customer, he or she may feel that he or she is appreciated by the retailer and/or special. However, many people receive a large number of emails from retailers every day. For example, a person may receive fifteen or more emails from retailers every day that are automatically generated. This volume of emails makes promotional emails seem quite commonplace, making some customers feel as if they are a nuisance as opposed to a special offer. Consequently, a need exists for new techniques for selecting and delivering promotions to customers.

Described herein are systems, methods, and apparatuses for presenting promotion indicators to users. In some embodiments, the promotion indicators are presented in a manner that provides excitement for the customers. For example, the promotion indicators can be included in an augmented reality presentation presented via a customer's mobile device. In one embodiment, the promotions are selected for the customer and an indication of the promotion is transmitted to the customer's mobile device (e.g., cellular telephone, tablet, personal digital assistant, smartwatch, media player, etc.). When the customer orients his or her mobile device toward the location at which the promotion is fixed, the mobile device presents the augmented reality presentation including the promotion indicator. The discussion of FIG. 1 provides an overview of such a system.

FIG. 1 depicts an augmented reality presentation including a promotion indicator 108 presented via a mobile device 102, according to some embodiments. As a customer shops in a retail facility, his or her mobile device 102 can transmit information to a backend system associated with the retail facility. For example, in one embodiment, the customer may provide his or her permission via an application for the retailer to receive the information from his or her mobile device 102. In one embodiment, the information includes a user identifier associated with the customer (e.g., a "user" of the system) and a location indicator of the mobile device 102. The backend system identifies the customer based on the user identifier and looks up user data for the customer. The user data can include any desired information, such as transaction histories, browsing histories, user demographics, user preferences, dates associated with users (e.g., birthdays, anniversaries, subscription expiration dates, etc.), etc. The system selects a promotion for the user based on the user data. For example, based on the user data, the system can determine that the customer typically purchases a one unit of a soft drink when he or she visits the retail facility but has not done so recently. In this example, the system can select a promotion for the soft drink in an attempt to 1) encourage the customer to purchase the soft drink and 2) create a feeling of appreciation in the customer.

The promotion is presented to the customer via the promotion indicator 108 in an augmented reality (AR) presentation. In one embodiment, the system fixes the promotion indicator 108 to a specific location. That is, the system associates a location, for example within the retail facility, with the promotion indicator 108 associated with the promotion for the customer. When the customer orients his or her mobile device 102 toward the location, the mobile device 102 presents the promotion indicator 108 in an augmented reality (AR) presentation. As depicted in FIG. 1, the augmented reality presentation includes the promotion indicator 108 located on an AR image 106 of a table 104. The augmented reality presentation also includes a text portion 110 that provides a description of the promotion selected for the customer. In embodiments in which the augmented reality presentation includes the text portion 110, the text portion 110 may not be presented until the customer selects the promotion indicator 108 via the mobile device 102 (e.g., taps the promotion indicator 108).

In some embodiments, when the user selects the promotion indicator 108, the promotion associated with the promotion indicator 108 is associated with the customer. For example, the promotion can be added to the customer's account, the customer's virtual cart, the customer's virtual wallet, etc. When the customer completes his or her purchase (e.g., at a point-of-sale (POS) terminal or online), the promotion, if applicable, is applied to the customer's purchase.

Figure 2:
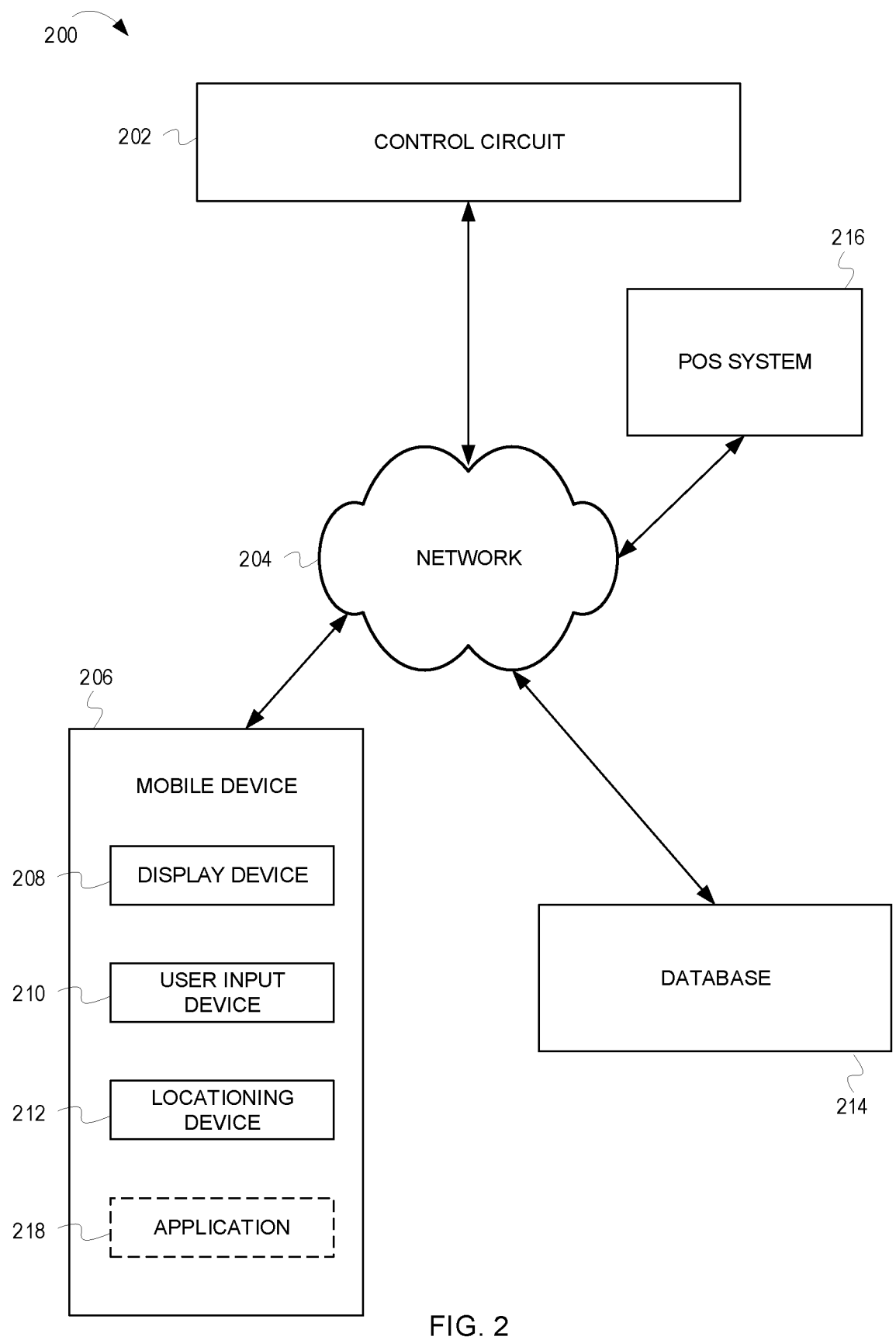
FIG. 2 is a block diagram of a system 200 for presenting promotion indicators to users, according to some embodiments.

While the discussion of FIG. 1 provides an overview of presenting promotion indicators, the discussion of FIG. 2 provides additional detail regarding such a system.

FIG. 2 is a block diagram of a system 200 for presenting promotion indicators to users, according to some embodiments. The system 200 includes a control circuit 202, a mobile device 206, a database 214, and a POS system 216. One or more of the control circuit 202, mobile device 206, database 214, and POS system 216 are communicatively coupled via a network 204. Accordingly, the network 204 can be of any suitable type. For example, the network 204 can include a local area network (LAN) and/or wide area network (WAN), such as the Internet. The network can include wired and/or wireless links.

The database 214 is configured to store user data. The user data can include any suitable information, such as, for example, transaction histories (e.g., purchases, returns, exchanges, orders, etc.), browsing histories (e.g., online and/or in a retail facility), user demographics, user preferences, dates associated with users, user identifiers (e.g., customer numbers, account numbers, usernames, etc.), etc. In some embodiments, the system 200 does not store any user data unless and until a customer has provided explicit consent for such data to be stored and/or collected. Additionally, in some embodiments, customers may be able to select what information is collected and/or stored by the system 200. In some embodiments, the database 214 stores indications of promotions. For example, the database 214 can store indications of promotions selected by customers. In such embodiments, the database can store an association between the user identifier of the customer that selected the promotion indicator and the promotion associated with the promotion indicator. When the customer wishes to complete the transaction, for example via the POS system 216, the POS system 216 can retrieve the indication of the promotion from the database 214 and apply the promotion to the customer's purchase.

The POS system 216 can take any suitable form, based on the ecosystem in which it operates. For example, in a strictly brick-and-mortar setting, the POS system 216 may include a POS terminal at which a customer can purchase products. In an online ecosystem, the POS system 216 can include backend servers (e.g., the POS system 216 is cloud-based) that allow the customer to complete the transaction via his or her mobile device 206, computer, automotive infotainment system, etc. While these are just two example, other possibilities, and combinations, of online and/or brick-and-mortar facilities exist. For example, a customer may be able to purchase items online as well as in-store, purchase items in-store in a scan-and-go manner (i.e., without the use of a traditional POS terminal), etc., and the POS system 216 is adaptable to accommodate a variety of embodiments.

The mobile device 206 can be of any suitable type. For example, the mobile device 206 can be a smartphone, a tablet, smartwatch, etc. The mobile device 206 includes a display device 208 (e.g., a light emitting diode (LED), liquid crystal display (LCD), etc. device), a user input device 210 (e.g., a keyboard, trackpad, number pad, etc.), and a locationing device 212. In some embodiments, the display device 208 and user input device 210 are integrated into a single component, such as a touchscreen. The locationing device 212 can be any device that is capable of being used to determine a location of the mobile device 206. For example, in one embodiment, the locationing device 212 can be a system dedicated specifically to determining locations, such as a global positioning system (GPS) device. Alternatively, the locationing device 212 can be a wireless radio used to communicate with beacons to determine the location of the mobile device 206. For example, the wireless radio can be a Wi-Fi radio, a Bluetooth radio, a Bluetooth Low Energy (BLE) radio, etc. and the beacons can be access points or other devices. In such embodiments, the mobile device 206 communicates with multiple access points and uses the communications to calculate the position of the mobile device 206, for example, based on triangulation. Further, in some embodiments, the backend can calculate the location of the mobile device 206 based on the data provided by the mobile device. In such embodiments, the location indicator can be information regarding communications between the mobile device's radio (i.e., locationing device) and the beacons.

The control circuit 202 generally selects promotions for customers and transmits promotion indicators to mobile devices. The control circuit 202 can comprise a fixed-purpose hard-wired hardware platform (including but not limited to an application-specific integrated circuit (ASIC) (which is an integrated circuit that is customized by design for a particular use, rather than intended for general-purpose use), a field-programmable gate array (FPGA), and the like) or can comprise a partially or wholly-programmable hardware platform (including but not limited to microcontrollers, microprocessors, and the like). These architectural options for such structures are well known and understood in the art and require no further description here. The control circuit 202 is configured (for example, by using corresponding programming as will be well understood by those skilled in the art) to carry out one or more of the steps, actions, and/or functions described herein. Additionally, in one embodiment, the control circuit 202 can be implemented at a server.

By one optional approach the control circuit 202 operably couples to a memory. The memory may be integral to the control circuit 202 or can be physically discrete (in whole or in part) from the control circuit 202 as desired. This memory can also be local with respect to the control circuit 202 (where, for example, both share a common circuit board, chassis, power supply, and/or housing) or can be partially or wholly remote with respect to the control circuit 202 (where, for example, the memory is physically located in another facility, metropolitan area, or even country as compared to the control circuit 202).

This memory can serve, for example, to non-transitorily store the computer instructions that, when executed by the control circuit 202, cause the control circuit 202 to behave as described herein. As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM) as well as volatile memory (such as an erasable programmable read-only memory (EPROM).

In one embodiment, the control circuit 202 selects promotions that are specific to customers. For example, the control circuit 202 can receive a user identifier and location indicator from the mobile device 206. The control circuit 202 then access the database 214 to retrieve user data for the customer based on the user identifier. The control circuit 202 selects a promotion for the user based on the user data. For example, if the customer typically purchases Brand X cleaning solution, the control circuit 202 can select a promotion for a Brand Y cleaning solution, a competitive cleaning solution. The control circuit 202 associates the promotion indicator with a location near the mobile device 206. For example, the control circuit 202 can select a location for the promotion indicator based on the location indicator received from the mobile device 206. In such embodiments, the control circuit 202 associates the promotion indicator with a location near the mobile device 206 so that the customer does not need to exert significant effort to find the promotion indicator. In other embodiments, the control circuit 202 can select locations that are not near the mobile device 206. In one embodiment, the control circuit 202 can select locations in an attempt to encourage the customer to visit locations of the retail facility that he or she does not typically visit. For example, if the customer typically purchases cleaning solution at the retail facility but not tools with which to apply the cleaning solution, the control circuit can select as the location a portion (e.g., an aisle) of the retail facility in which tools to apply cleaning solution are located.

The mobile device 206 is configured to present an augmented reality presentation to the customer. The augmented reality presentation includes the promotion indicator. In one embodiment, upon receipt of a promotion indicator from the control circuit 202, the mobile device 206 can present a notification to the customer indicating that a promotion indicator is available and/or that the customer is near a promotion indicator. The customer can then use the mobile device 206 to "search for" the promotion indicator. For example, if the augmented reality presentation is application-based (i.e., the application generates the virtual reality presentation), the customer can open the application via the mobile device 206. The application can be associated with the retail facility (e.g., the retailer) or a general purpose application adapted for sue with the retailer's systems. As the customer moves the mobile device 206 (i.e., alters the orientation of the mobile device 206), the application can update the augmented reality presentation. When the customer orients the mobile device 206 toward the location of the promotion indicator, the application updates the augmented reality presentation to include the promotion indicator.

In some embodiments, the customer can select the promotion indicator via the mobile device 206. For example, the customer, using the user input device 210, can select the promotion indicator from the augmented reality presentation presented via the display device 208. Selection of the promotion indicator associates the promotion with the customer, for example, in the database 214.

In some embodiments, the mobile device 206 includes an application 218. The application 218 comprises computer program code that is configured to be installed on and executed by the mobile device 206 (e.g., by a processor of the mobile device 206, described in more detail with respect to FIG. 4). The application 218 can be executed by the mobile device 206 in concert with other software modules or applications (computer program code), or groups of applications, such as operating systems, locationing applications (e.g., a mapping, GPS, etc. applications), two-factor authentication (TFA) applications, single sign on (SSO) applications, graphics processing applications, security applications, etc. In one embodiment, the application 218 is a promotion application, as described herein. In such embodiments, the application can be a dedicated application (e.g., an application specific to a retailer or to promotion presentation) or a general application that while not a "dedicated application" can perform the functions as described herein with respect to the promotion application. In some embodiments, the application 218 is an add-on application installed on the mobile device 206 and that cooperates with other application/s of the mobile device 206, such as the operating system and works with the other application/s to provide the functionality described herein. For example, in the embodiment illustrated in FIG. 2 the add-on application communicates with the operating system application of the mobile device 206 to control and receive data from at least the display device 208, the user input device 210 and the locationing device 212. In some embodiments, the application 218 is integral with other applications of the mobile device such as the operating system. For example, in the embodiment illustrated in FIG. 2, the integral application controls and receives data from at least the display device 208, the user input device 210 and the locationing device 212.

Figure 3:
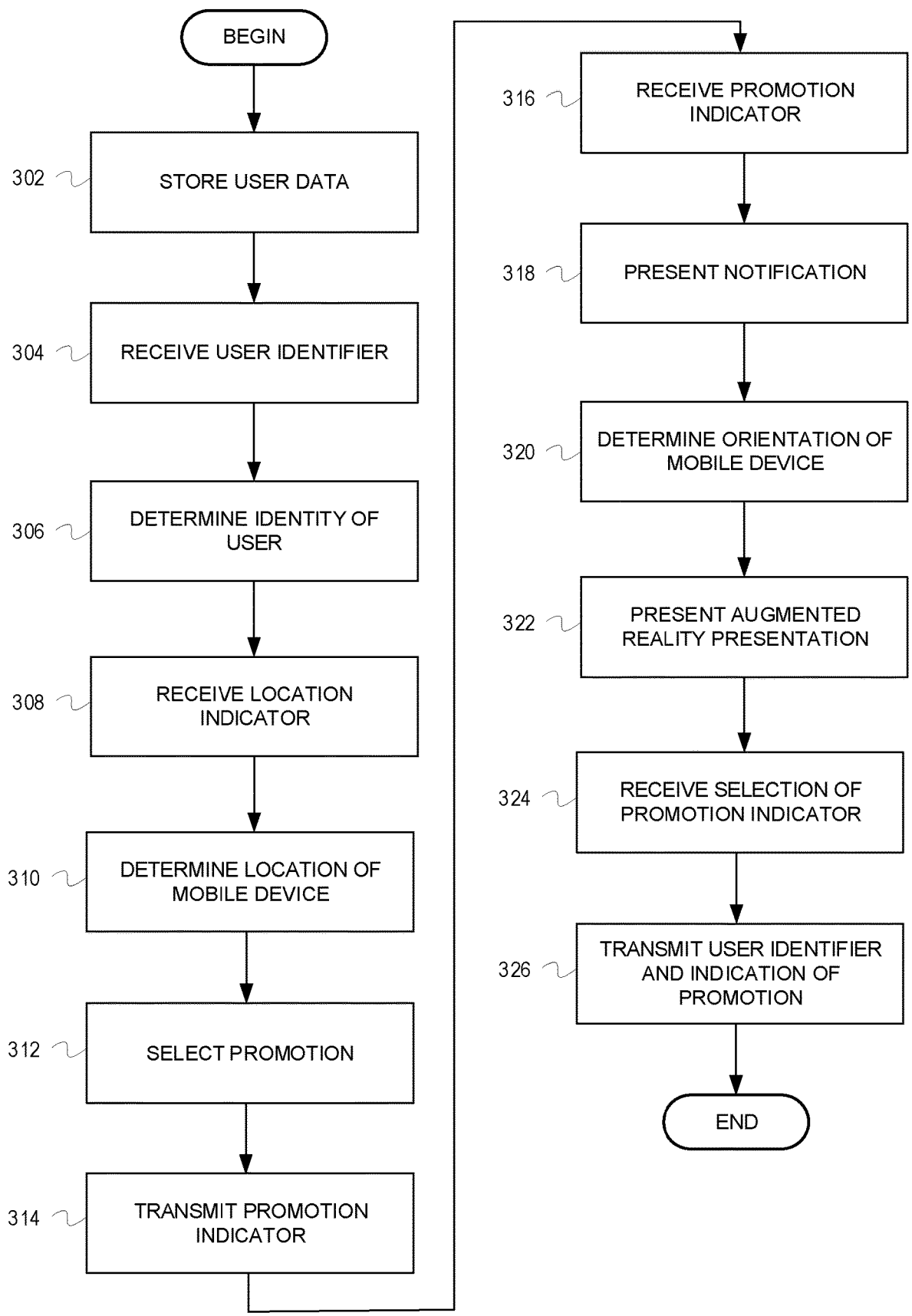
FIG. 3 is a flow chart depicting example operations for presenting promotion indicators to user, according to some embodiments.

While the discussion of FIG. 2 provides additional detail regarding a system for presenting promotion indicators, the discussion of FIG. 3 describes example operations of such a system.

FIG. 3 is a flow chart depicting example operations for presenting promotion indicators to user, according to some embodiments. The flow begins at block 302.

At block 302, user data is stored. For example, a database can store the user data. The user data can include any suitable information, such as, for example, transaction histories (e.g., purchases, returns, exchanges, orders, etc.), browsing histories (e.g., online and/or in a retail facility), user demographics, user preferences, dates associated with users, user identifiers (e.g., customer numbers, account numbers, usernames, etc.), etc. The flow continues at block 304.

At block 304, a user identifier is received. For example, a control circuit can receive a user identifier from a mobile device. The identity of the user can be determined from the user and identifier and the user identifier can take any suitable form. For example, the user identifier can be a username, a phone number, an email address, a customer number, an account number, a device identifier (e.g., a media access control (MAC) address), an internet protocol (IP) address, etc. The flow continues at block 306.

At block 306, an identity of the user is determined. For example, the control circuit can determine the identity of the user. The control circuit can determine the identity of the user based on accessing the database. That is, the control circuit can determine what user data is associated with the user based on the user identifier. The flow continues at block 308.

At block 308, a location indicator is received. For example, the control circuit can receive the location indicator from the mobile device. The location indictor is indicative of the mobile device's location. In one embodiment, the mobile device is located in a retail facility. Additionally, or alternatively, the mobile device can be located outside of a retail facility. In such embodiments, the user may be able to select promotion indicators when he or she is not shopping in a retail facility. The flow continues at block 310.

At block 310, a location of the mobile device is determined. For example, the control circuit can determine the location of the mobile device based on the location indicator. The flow continues at block 312.

At block 312, a promotion is selected. For example, the control circuit can select the promotion. The control circuit can select the promotion based on the user data associated with the user and/or the location of the mobile device. The promotion can be of any suitable type. For example, the promotion can be a discount, a subscription offer, an availability (e.g., the ability to purchase an item), a sale, etc. The flow continues at block 314.

At block 314, a promotion indicator is transmitted. For example, the control circuit can transmit the promotion indicator to the mobile device. Though the process as described herein is transmission of the promotion indicator, because the promotion indicator is part of an augmented reality presentation, the control circuit doesn't literally transmit the promotion indictor to the mobile device. Rather, the control circuit transmits data associated with the promotion indicator such that the mobile device can present the augmented reality presentation including the promotion indicator. The promotion indicator is associated with the promotion selected by the control circuit. The promotion indicator can take any desired form. For example, the promotion indicator can be a gem, a box, a present, a bag, a symbol, a word, etc. The flow continues at block 316.

At block 316, the promotion indicator is received. For example, the mobile device can receive the promotion indicator from the control circuit. In one embodiment, the promotion indicator is received by an application executing on the mobile device. The flow continues at block 318.

At block 318, a notification is presented. For example, the mobile device can present a notification to the user. In one embodiment, the application executing on the mobile device causes presentation of the notification to the user. The notification can indicate to the user that a promotion indicator is available, has been received, and/or is nearby. For example, in embodiments in which the control circuit associates the promotion indicator with a location near the mobile device, the mobile device can present a notification indicating that the user is near a promotion indicator. In some embodiments, this notification can be designed to appear as if the user has found the promotion indicator in, for example, a gamified manner. In embodiments in which the promotion indicator is not necessarily located near the mobile device, the notification can alert the user that a promotion indicator is available and encourage the user to find the promotion indicator, possibly providing clues, directions, etc. to the location of the promotion indicator. The flow continues at block 320.

At block 320, an orientation of the mobile device is determined. For example, the mobile device can determine its orientation. In one embodiment, the application executing on the mobile device can determine the orientation of the mobile device. The mobile device can determine its orientation based on any suitable data (e.g., gyroscope data, GPS data, triangulation data, etc.). Because the promotion indicator is fixed on the location, the promotion indicator will not appear in the augmented reality presentation unless the mobile device is oriented toward the location (i.e., the location with which the promotion indicator is associated). The flow continues at block 322.

At block 322, the augmented reality presentation is presented. For example, the mobile device can present the augmented reality presentation. In one embodiment, the application executing on the mobile device can cause presentation of the augmented reality presentation. If the mobile device is oriented toward the location (i.e., the location with which the promotion indicator is associated), the augmented reality presentation includes the promotion indicator. The flow continues at block 324.

At block 324, a selection of the promotion indicator is received. For example, the mobile device can receive the selection of the promotion indicator. In one embodiment, the application executing on the mobile device can receive the selection of the promotion indicator. The mobile device receives the selection of the promotion indicator via a user input device of the mobile device. The flow continues at block 326.

At block 326, the user identifier and the indication of the promotion are transmitted. For example, the mobile device can transmit the user identifier and the indication of the promotion to the database for storage. In one embodiment, the application executing on the mobile device can cause transmission of the user identifier and the indication of the promotion to the database for storage. If the user selects the promotion, the promotion is added to the user's account. For example, the promotion can be added to the user's virtual wallet, associated with the user's shopping account, etc. When the customer completes a transaction, the promotion, if applicable, is applied to the transaction.

Figure 4:
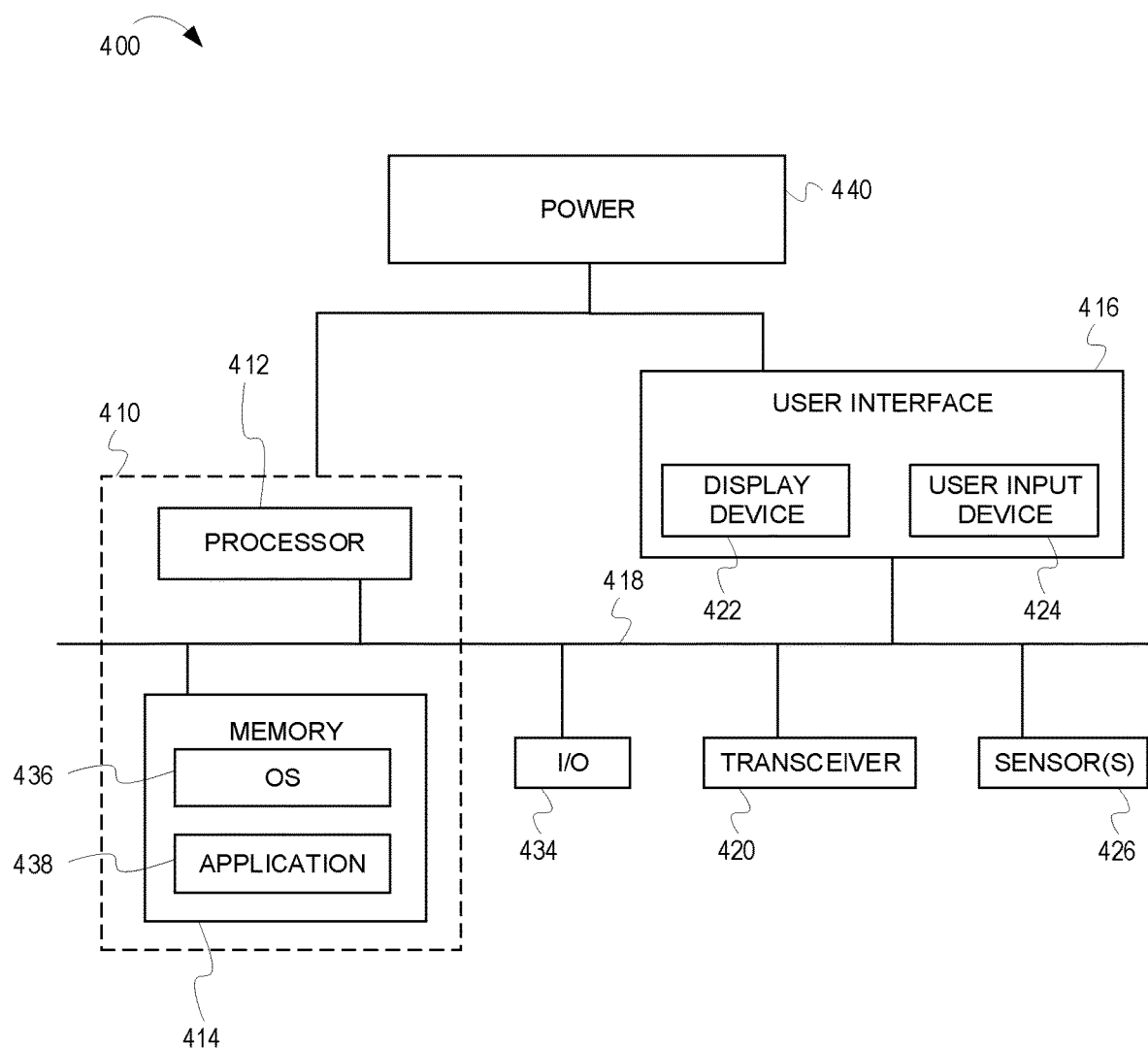
FIG. 4 is a block diagram of a mobile device 400, according to some embodiments.

While the discussion of FIG. 3 describes example operations of a system for presenting promotion indicators, the discussion of FIG. 4 describes an example mobile device and an application configured to be executed by the mobile device.

FIG. 4 is a block diagram of a mobile device 400, according to some embodiments. The mobile device 400 may be used for implementing any of the components, systems, functionality, apparatuses, processes, or devices of the system 200 of FIG. 2, and/or other above or below mentioned systems or devices, or parts of such functionality, systems, apparatuses, processes, or devices. The systems, devices, processes, methods, techniques, functionality, services, servers, sources and the like described herein may be utilized, implemented and/or run on many different types of devices and/or systems.

By way of example, the mobile device 400 may comprise a control circuit or processor 412, memory 414, and one or more communication links, paths, buses or the like 418. Some embodiments may include one or more user interfaces 416, and/or one or more internal and/or external power sources or supplies 440. The control circuit 412 can be implemented through one or more processors, microprocessors, central processing unit, logic, local digital storage, firmware, software, and/or other control hardware and/or software, and may be used to execute or assist in executing the steps of the processes, methods, functionality and techniques described herein, and control various communications, decisions, programs, content, listings, services, interfaces, logging, reporting, etc. Further, in some embodiments, the processor 412 can be part of control circuitry and/or a control system 410, which may be implemented through one or more processors with access to one or more memory 414 that can store commands, instructions, code and the like that is implemented by the control circuit and/or processors to implement intended functionality. In some applications, the control circuit and/or memory may be distributed over a communications network (e.g., LAN, WAN, Internet) providing distributed and/or redundant processing and functionality. Again, the mobile device 400 may be used to implement one or more of the above or below, or parts of, components, circuits, systems, processes and the like.

In one embodiment, the memory 414 stores data and executable code, such as an operating system 436 and an application 438. The application 438 is configured to be executed by the mobile device 400 (e.g., by the processor 412). The application 438 can be a dedicated application (e.g., an application dedicated to promotional indicators) and/or a general purpose application (e.g., a web browser, a retail application etc.). Additionally, though only a single instance of the application 438 is depicted in FIG. 4, such is not required and the single instance of the application 438 is shown in an effort not to obfuscate the figures. Accordingly, the application 438 is representative of all types of applications resident on the mobile device (e.g., software preinstalled by the manufacturer of the mobile device, software installed by an end user, etc.). In one embodiment, the application 438 operates in concert with the operating system 436 when executed by the processor 412 to cause actions to be performed by the mobile device 400. For example, with respect to the disclosure contained herein, execution of the application 438 by the processor 412 causes the mobile device to perform actions consistent with the presentation of promotional indicators described herein.

The user interface 416 can allow a user to interact with the system 400 and receive information through the system. In some instances, the user interface 416 includes a display device 422 and/or one or more user input device 424, such as buttons, touch screen, track ball, keyboard, mouse, etc., which can be part of or wired or wirelessly coupled with the mobile device 400. Typically, the mobile device 400 further includes one or more communication interfaces, ports, transceivers 420 and the like allowing the mobile device 400 to communicate over a communication bus, a distributed computer and/or communication network (e.g., a local area network (LAN), wide area network (WAN) such as the Internet, etc.), communication link 418, other networks or communication channels with other devices and/or other such communications or combination of two or more of such communication methods. Further the transceiver 420 can be configured for wired, wireless, optical, fiber optical cable, satellite, or other such communication configurations or combinations of two or more of such communications. Some embodiments include one or more input/output (I/O) ports 434 that allow one or more devices to couple with the mobile device 400. The I/O ports can be substantially any relevant port or combinations of ports, such as but not limited to USB, Ethernet, or other such ports. The I/O interface 434 can be configured to allow wired and/or wireless communication coupling to external components. For example, the I/O interface can provide wired communication and/or wireless communication (e.g., Wi-Fi, Bluetooth, cellular, RF, and/or other such wireless communication), and in some instances may include any known wired and/or wireless interfacing device, circuit and/or connecting device, such as but not limited to one or more transmitters, receivers, transceivers, or combination of two or more of such devices.

In some embodiments, the mobile device 400 may include one or more sensors 426 to provide information to the system and/or sensor information that is communicated to another component, such as the central control system, a delivery vehicle, etc. The sensors 426 can include substantially any relevant sensor, such as distance measurement sensors (e.g., optical units, sound/ultrasound units, etc.), optical-based scanning sensors to sense and read optical patterns (e.g., bar codes), radio frequency identification (RFID) tag reader sensors capable of reading RFID tags in proximity to the sensor, imaging system and/or camera, other such sensors or a combination of two or more of such sensor systems. The foregoing examples are intended to be illustrative and are not intended to convey an exhaustive listing of all possible sensors. Instead, it will be understood that these teachings will accommodate sensing any of a wide variety of circumstances in a given application setting.

The mobile device 400 comprises an example of a control and/or processor-based system with the control circuit 412. Again, the control circuit 412 can be implemented through one or more processors, controllers, central processing units, logic, software and the like. Further, in some implementations the control circuit 412 may provide multiprocessor functionality.

The memory 414, which can be accessed by the control circuit 412, typically includes one or more processor-readable and/or computer-readable media accessed by at least the control circuit 412, and can include volatile and/or nonvolatile media, such as RAM, ROM, EEPROM, flash memory and/or other memory technology. Further, the memory 414 is shown as internal to the control system 410; however, the memory 414 can be internal, external or a combination of internal and external memory. Similarly, some or all of the memory 414 can be internal, external or a combination of internal and external memory of the control circuit 412. The external memory can be substantially any relevant memory such as, but not limited to, solid-state storage devices (SSDs) or drives, hard disk drives (HDDs), one or more of universal serial bus (USB) stick or drive, flash memory secure digital (SD) card, other memory cards, and other such memory or combinations of two or more of such memory, and some or all of the memory may be distributed at multiple locations over a computer network. The memory 414 can store code, software, executables, scripts, data, content, lists, programming, programs, log or history data, user information, customer information, product information, and the like. While FIG. 4 illustrates the various components being coupled together via a bus, it is understood that the various components may actually be coupled to the control circuit and/or one or more other components directly.

Further, it is noted that while FIG. 4 illustrates a generic architecture of the mobile device 400 in some embodiments, this similar architecture can apply to at least the control circuit 202 of FIG. 2. For example, the control circuit 202 could equate to the control circuit 412 of FIG. 4, and it is understood that the control circuit 202 would likewise be coupled to or have access to one or more of memories, power, user interfaces, I/Os, transceivers, sensors, etc.

In some embodiments, a system for presenting promotion indicators to users comprises a database, wherein the database is configured to store user data, a control circuit, wherein the control circuit is configured to receive, from a mobile device, a user identifier associated with a user, determine, based on the user identifier, an identity of the user, receive, from the mobile device, a location indicator, determine, based on the location indicator, a location of the mobile device, select, based on the identity of the user and the location of the mobile device, a promotion, transmit, for presentation via the mobile device, a promotion indicator associated with the promotion, wherein the promotion indicator is associated with a location near the location of the mobile device, and an application configured to be executed on the mobile device, wherein the application when executed by the mobile device is configured to receive, from the control circuit, the promotion indicator associated with the promotion, cause presentation, to the user, of a notification that the promotion indicator is available, determine that the mobile device is oriented toward the location, cause presentation, in response to determining that the mobile device is oriented toward the location via a display device, of an augmented reality presentation including the promotion indicator associated with the promotion, receive, via a user input device from the user, selection of the promotion indicator, and cause transmission, to the database for storage, of the user identifier and an indication of the promotion.

In some embodiments, an apparatus and a corresponding method performed by the apparatus, comprises storing, in a database, user data, receiving, at a control circuit from a mobile device, a user identifier associated with a user, determining, by the control circuit based on the user identifier, an identity of the user, receiving, by the control circuit from the mobile device, a location indicator, determining, by the control circuit based on the location indicator, a location of the mobile device, selecting, by the control circuit based on the identity of the user and the location of the mobile device, a promotion, transmitting, by the control circuit for presentation via the mobile device, a promotion indicator associated with the promotion, wherein the promotion indicator is associated with a location near the location of the mobile device, receiving, by the mobile device from the control circuit, the promotion indicator associated with the promotion, causing presentation, by an application executed on the mobile device to the user, of a notification that the promotion indicator is available, determining, by the application executing on the mobile device, that the mobile device is oriented toward the location, causing presentation, by the application executing on the mobile device via a display device of the mobile device in response to determining that the mobile device is oriented toward the location, of an augmented reality presentation including the promotion indicator associated with the promotion, receiving, by the application executing on the mobile device via a user input device of the mobile device from the user, selection of the promotion indicator, and causing transmission, by the application executing on the mobile device to the database for storage, of the user identifier and an indication of the promotion.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. An augmented reality system for presenting promotion indicators to users, the system comprising:
   a database, wherein the database is configured to store user data;
   a control circuit, wherein the control circuit is configured to:
      receive, from a mobile device, a user identifier associated with a user;
      determine, based on the user identifier, an identity of the user;
      receive, from the mobile device, a location indicator;
      determine, based on the location indicator, a location of the mobile device;
      select, based on the identity of the user and the location of the mobile device, a promotion;
      transmit, for presentation via the mobile device, a promotion indicator associated with the promotion, wherein the promotion indicator is associated with another location near the location of the mobile device;
   an application configured to be executed on the mobile device, wherein the application when executed by the mobile device is configured to:
      receive, from the control circuit, the promotion indicator associated with the promotion;
      cause presentation, to the user, of a notification on a display of the mobile device that the promotion indicator is available prior to displaying the promotion indicator;
      determine that the mobile device is oriented toward the other location of the promotion indicator based on gyroscope data from the mobile device;
      in response to a determination that the mobile device is oriented toward the other location of the promotion indicator, cause presentation to the user on the display of an augmented reality presentation including the promotion indicator associated with the promotion, the promotion indicator in the augmented reality presentation being selectable by a user via a user input device of the mobile device;
      in response to a determination that the user selected the promotion indicator via the user input device, cause presentation, within the augmented reality presentation on the display, of a text portion that is associated with the promotion indicator and that provides a description of the promotion;
cause transmission, to the database for storage, of the user identifier and an indication of the promotion; and
update the augmented reality presentation to remove the promotion indicator in response to determining that the mobile device is no longer oriented toward the other location based on the gyroscope data.

2. The system of claim 1, further comprising:
a point-of-sale (POS) system, wherein the POS system is configured to:
retrieve, from the database, the indication of the promotion; and
apply, to a purchase associated with the user, the promotion.

3. The system of claim 2, wherein the POS system is one of 1) an in-store terminal and the user completes the purchase via the in-store terminal and 2) cloud-based and the user completes the purchase via the application executing on the mobile device.

4. The system of claim 1, wherein the user data includes one or more of transaction histories, browsing histories, user demographics, user preferences, dates associated with the users, and user identifiers.

5. The system of claim 1, wherein the application generates the augmented reality presentation.

6. The system of claim 5, wherein the application is associated with a retailer.

7. The system of claim 1, wherein the promotion is one or more of a discount, a subscription offer, an availability, and a sale.

8. The system of claim 1, wherein the promotion indicator is one or more of a gem, a box, a present, a bag, a symbol, and a word.

9. The system of claim 1, further comprising:
the mobile device, wherein the promotion indicator is viewable only on the mobile device.

10. The system of claim 1, wherein the mobile device includes a Bluetooth radio, and wherein the location of the mobile device is based on Bluetooth low energy (BLE) technology.

11. A method for presenting promotion indicators to users, the method comprising:
storing, in a database, user data;
receiving, at a control circuit from a mobile device, a user identifier associated with a user;
determining, by the control circuit based on the user identifier, an identity of the user;
receiving, by the control circuit from the mobile device, a location indicator;
determining, by the control circuit based on the location indicator, a location of the mobile device;
selecting, by the control circuit based on the identity of the user and the location of the mobile device, a promotion;
transmitting, by the control circuit for presentation via the mobile device, a promotion indicator associated with the promotion, wherein the promotion indicator is associated with another location near the location of the mobile device;

receiving, by the mobile device from the control circuit, the promotion indicator associated with the promotion;
causing presentation, by an application executing on the mobile device to the user, of a notification on a display of the mobile device that the promotion indicator is available prior to displaying the promotion indicator;
determining, by the application executing on the mobile device, that the mobile device is oriented toward the other location of the promotion indicator based on gyroscope data from the mobile device;
in response to the determining that the mobile device is oriented toward the other location of the promotion indicator, causing presentation to the user on the display of an augmented reality presentation including the promotion indicator associated with the promotion, the promotion indicator in the augmented reality presentation being selectable by a user via a user input device of the mobile device;
in response to a determination that the user selected the promotion indicator via the user input device of the mobile device, cause presentation, within the augmented reality presentation on the display, of a text portion that is associated with the promotion indicator and that provides a description of the promotion;
causing transmission, by the application executing on the mobile device to the database for storage, of the user identifier and an indication of the promotion; and
updating the augmented reality presentation to remove the promotion indicator in response to determining that the mobile device is no longer oriented toward the location based on the gyroscope data.

12. The method of claim 11, further comprising:
retrieving, by a point-of-sale (POS) system from the database, the indication of the promotion; and
applying, by the POS system to a purchase associated with the user, the promotion.

13. The method of claim 12, wherein the POS system is one of 1) an in-store terminal and the user completes the purchase via the in-store terminal and 2) cloud-based and the user completes the purchase via the mobile device.

14. The method of claim 11, wherein the user data includes one or more of transaction histories, browsing histories, user demographics, user preferences, dates associated with the users, and user identifiers.

15. The method of claim 11, further comprising:
executing, by the mobile device, the application, wherein the application when executing on the mobile device generates the augmented reality presentation.

16. The method of claim 15, wherein the application is associated with a retailer.

17. The method of claim 11, wherein the promotion is one or more of a discount, a subscription offer, an availability, and a sale.

18. The method of claim 11, wherein the promotion indicator is one or more of a gem, a box, a present, a bag, a symbol, and a word.

19. The method of claim 11, wherein the promotion indicator is viewable only on the mobile device.

20. The method of claim 11, wherein the mobile device includes a Bluetooth radio, and wherein the location of the mobile device is based on Bluetooth low energy (BLE) technology.

* * * * *